United States Patent [19]
Togari et al.

[11] Patent Number: 5,719,372
[45] Date of Patent: Feb. 17, 1998

[54] LASER MARKING SYSTEM AND METHOD USING CONTROLLED PULSE WIDTH OF Q-SWITCH

[75] Inventors: Satoshi Togari; Yoshimitsu Baba, both of Tokyo, Japan

[73] Assignee: NEC Corporation, Tokyo, Japan

[21] Appl. No.: 558,780

[22] Filed: Nov. 16, 1995

[30] Foreign Application Priority Data

Nov. 17, 1994 [JP] Japan ................... 6-283570

[51] Int. Cl.$^6$ ................................ B23K 26/00
[52] U.S. Cl. ................ 219/121.61; 219/121.68; 219/121.69; 219/121.8
[58] Field of Search ............ 219/121.6, 121.61, 219/121.62, 121.68, 121.69, 121.8, 121.85; 347/255, 260, 259; 372/10, 13; 358/297; 264/400

[56] References Cited

U.S. PATENT DOCUMENTS

| | | | |
|---|---|---|---|
| 3,657,510 | 4/1972 | Rothrock | 372/10 |
| 3,836,866 | 9/1974 | Ammann et al. | 372/12 |
| 4,630,275 | 12/1986 | Rapoport | 372/13 |
| 4,922,077 | 5/1990 | Gordon | 219/121.68 |
| 4,945,204 | 7/1990 | Nakamura et al. | 219/121.69 |
| 5,227,607 | 7/1993 | Ishiyama | 219/121.68 |
| 5,329,090 | 7/1994 | Woelki et al. | 219/121.68 |

FOREIGN PATENT DOCUMENTS

| | | | |
|---|---|---|---|
| 0291461 | 11/1988 | European Pat. Off. | |
| 53-25996 | 3/1978 | Japan | 219/121.61 |
| 59-45091 | 3/1984 | Japan | |
| 60-196283 | 10/1985 | Japan | 219/121.61 |
| 60-221721 | 11/1985 | Japan | |
| 4-98801 | 3/1992 | Japan | 219/121.68 |

Primary Examiner—Teresa J. Walberg
Assistant Examiner—Gregory L. Mills
Attorney, Agent, or Firm—Whitham, Curtis, Whitham & McGinn

[57] ABSTRACT

A laser marking system comprises a continuous-wave (CW) pumped Q-switch pulse laser and a laser controller. The Q-switch element switches on and off according to a repetition control signal received from the laser controller. The repetition control signal comprises an emission period in a repetition rate. The CW-pumped Q-switch pulse laser emits the laser beam through the Q-switch element during the emission period. The emission period or duty factor of the repetition control signal is adjusted such that the CW-pumped Q-switch pulse laser emits a pulse laser beam comprising a plurality of emission pulses during the emission period. The pulse laser beam is used to generate a scanning pulse laser beam which is focused on the workpiece to be marked in a desired pattern.

33 Claims, 7 Drawing Sheets

LASER MARKING SYSTEM AND METHOD USING CONTROLLED PULSE WIDTH OF Q-SWITCH

BACKGROUND OF THE INVENTION

1. Field of the invention

The present invention relates to a laser marking system, and in particular to a laser marking system and method for marking a workpiece with a laser beam scanning the surface thereof.

2. Description of the Related Art

Laser marking has been widely used to mark an electronic part with a specific pattern such as classification characters. Of the laser marking methods, there is known a beam-scanning marking method in which a laser beam scans the surface of the part in the specific pattern, which is disclosed in Japanese Patent Unexamined Publication Nos. 59-45091 and 60-221721. Generally, a solid state laser such as Nd:YAG laser is used as a laser light source.

Figure 1:
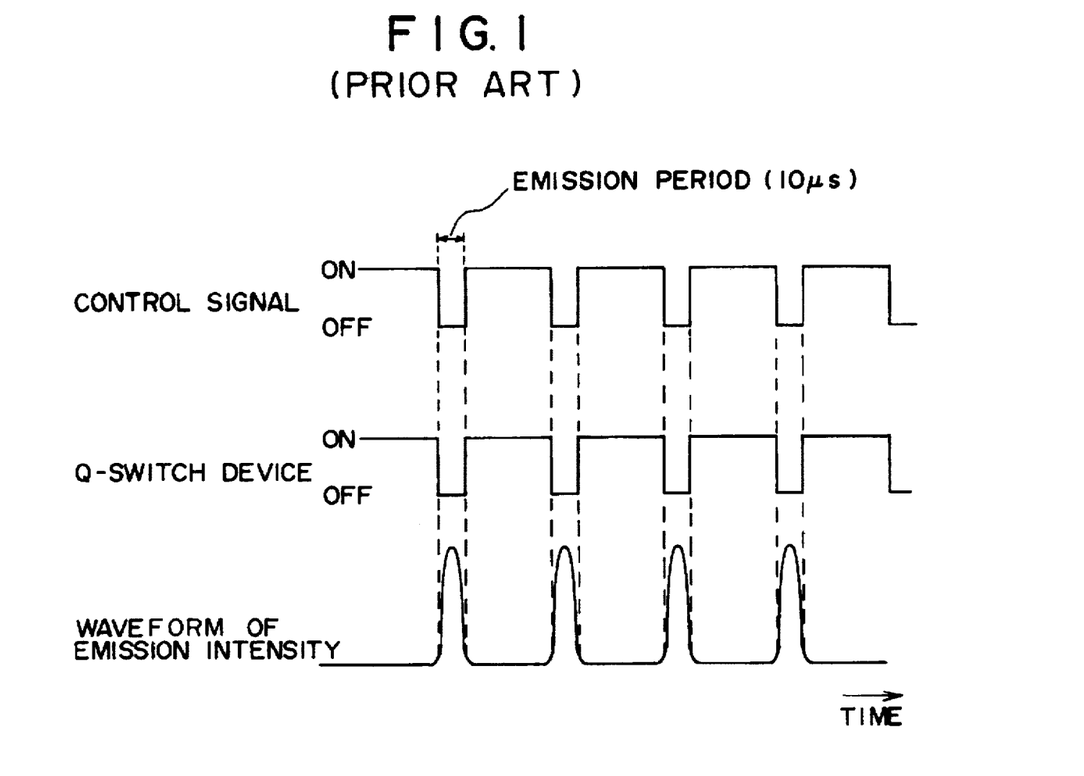
FIG. 1 is a waveform chart showing an conventional laser driving method in a laser marking system.

The solid state laser is typically provided with a Q-switch scheme which causes pulse repetition emission with a relatively high peak output in power. In a beam-scanning system, as shown in FIG. 1, the Q switch switches on and off according to a control signal, which causes the solid state laser to emit the laser light beam during the OFF period of the Q switch. Conventionally, the OFF period, or the emission period, is set at 10 microseconds (μsec) during which the laser beam is emitted instantaneously.

Figure 2:
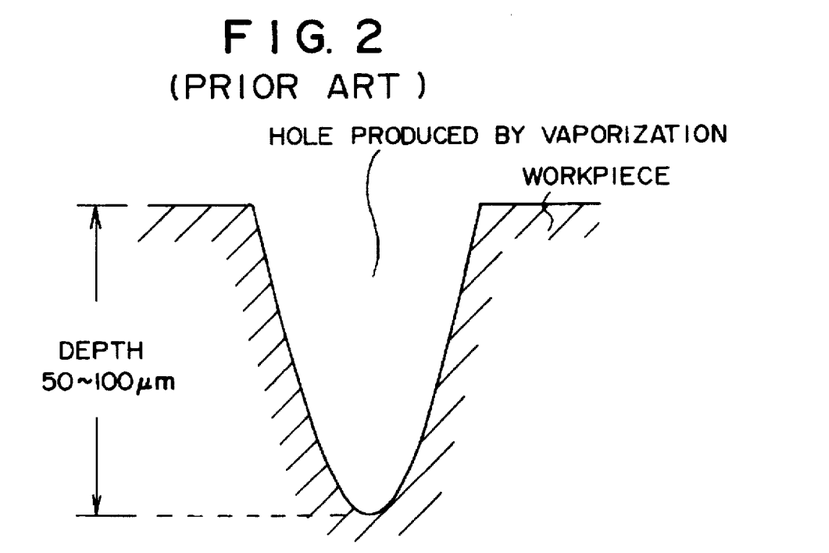
FIG. 2 is a schematic sectional view of a hole produced by vaporization according to the laser marking system as shown in FIG. 1.

However, when such a laser beam is focused on a certain position of the electronic part encapsulated in resin, the resin at that position is vaporized at an instant, and thereby a deep hole is formed reaching 50–100 micrometers in depth, as shown in FIG. 2. For this reason, the conventional laser marking method cannot be applied to a thin workpiece encapsulated in resin.

In order to reduce the peak level of the Q-switch laser beam, it is considered that the marking is performed by using the laser beam obtained by setting the repetition rate at 50 kHz or more so that the continuous-wave (CW) pumped Q-switch laser approaches a CW pumped laser. However, since the reduced peak level of the laser light causes the laser beam to decrease in power, it is necessary to lower the scanning speed of the laser beam so as to compensate for the power reduction, resulting in reduced performance of marking.

To avoid the reduced performance of marking, the scanning speed of the laser beam is usually kept at constant, and the repetition rate of the laser emission is adjusted to achieve the optimal condition of the laser marking system. However, a distance between adjacent holes produced by the laser beam is in reverse proportion to the repetition rate of the laser emission. Therefore, when the repetition rate is too low, adjacent holes are formed apart from each other, resulting in discontinuous marking lines. As the repetition rate is too high, the laser beam energy becomes denser, causing deeper holes than necessary. In other words, the conventional laser marking method cannot achieve clear marking lines having a relatively shallow depth.

SUMMARY OF THE INVENTION

An object of the present invention is to provide a laser marking method and system which can mark a workpiece with a pattern having a relatively shallow depth.

Another object of the present invention is to provide a laser marking method and system which can mark a workpiece with a clear and relatively shallow pattern without decreasing the marking performance.

Still another object of the present invention is to provide a laser marking method and system for marking a workpiece with a pattern having increased visibility and a relatively shallow depth.

According to the present invention, a specific characteristic of a continuous-wave (CW) pumped Q-switch pulse laser is used to generate a pulse laser beam for marking. The present invention is based on the fact that laser emission pulses vary in intensity and number with the emission period of the CW-pumped Q-switch pulse laser. In other words, a plurality of laser emission pulses are generated by adjusting the emission period of the CW-pumped Q-switch pulse laser with the laser emission pulses varying in intensity. The plural laser emission pulses are caused by the primary laser oscillation and the relaxation oscillation. Since the relaxation oscillation causes a plurality of secondary emission pulses with the primary emission pulse reducing in intensity, the plural laser emission pulses including the primary emission pulse having a relatively low intensity can be obtained by only adjusting the emission period without decreasing the repetition rate of the emission pulses or the scanning speed of the pulse laser beam. Therefore, a marking pattern having a relatively shallow depth is achieved by using the pulse laser beam having the plural laser emission pulses to scan a predetermined surface of the workpiece.

According to an aspect of the present invention, there is used a laser source which comprises a laser medium and a Q-switch element. The laser medium is continuously pumped and the Q-switch element switches on and off according to a repetition control signal. The repetition control signal comprises an emission period in a repetition rate. The laser source emits the laser beam through the Q-switch element during the emission period. The emission period or duty factor of the repetition control signal is adjusted such that the laser source emits a pulse laser beam comprising a plurality of emission pulses during the emission period. The pulse laser beam is changed in two orthogonal directions according to a predetermined pattern to generate a scanning pulse laser beam. The scanning pulse laser beam is focused on a predetermined surface of the workpiece placed at a predetermined position.

Preferably, at least the predetermined surface of the workpiece comprises a thermoplastic resin containing carbon. By melting and vaporizing portions of the predetermined surface of the workpiece with the scanning pulse laser beam scanning in the predetermined pattern, the carbon contained in the thermoplastic resin is deposited on the portions. Therefore, after removing the deposited carbon from the predetermined surface of the workpiece, those portions on the surface are discolored, resulting in improved visibility of the marking pattern.

More specifically, the laser medium is a Nd:YAG rod and the Q-switch element is an acousto-optic diffraction switch such as a ultrasonic Q-switch element. Further, the repetition control signal has a fixed repetition rate falling within a range from 5 kHz to 50 kHz and the emission period is adjusted to a period ranging from 20 μsec to 200 μSec.

DETAILED DESCRIPTION OF THE PREFERRED EMBODIMENTS

Figure 3:
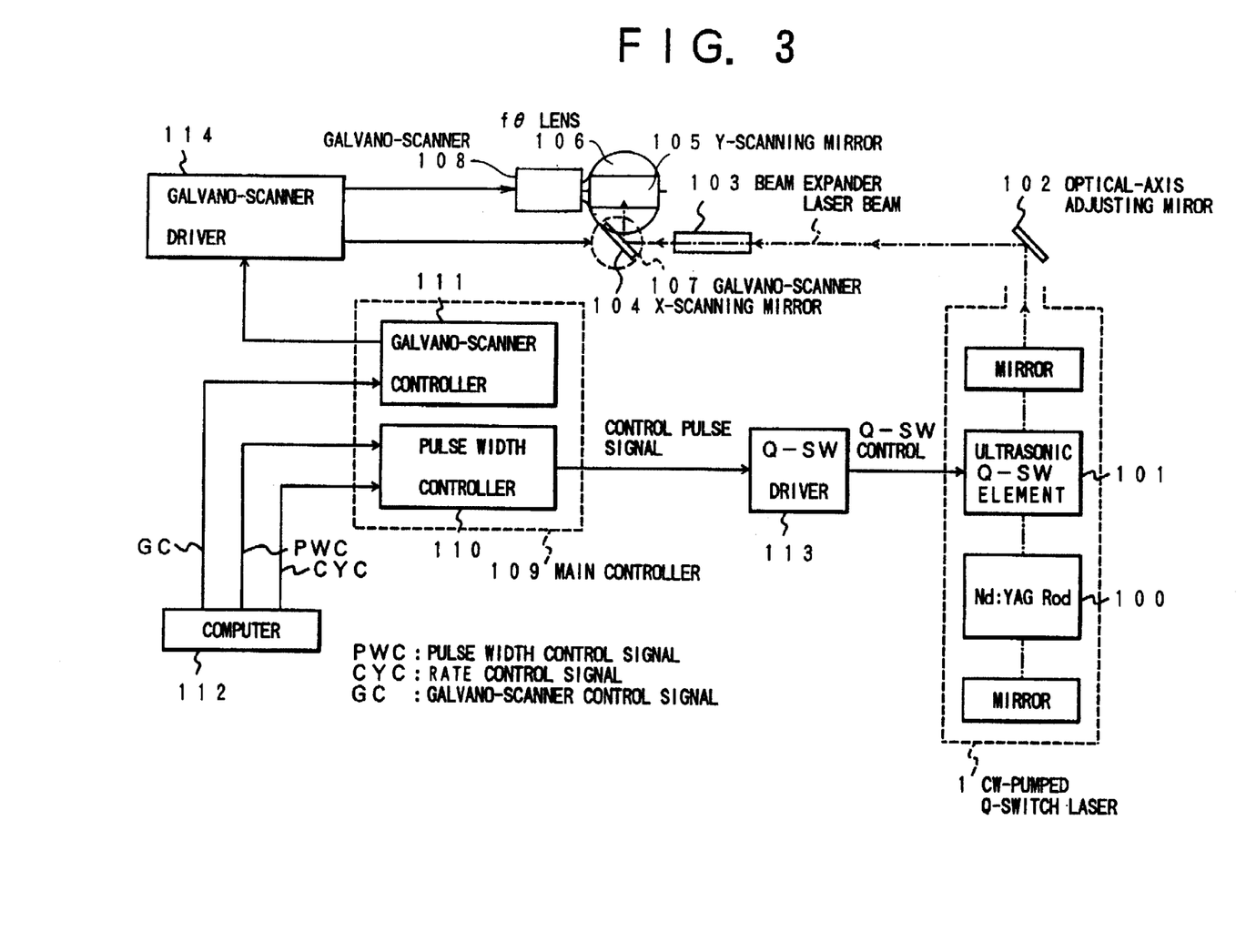
FIG. 3 is a block diagram showing the circuit configuration of an embodiment of a laser marking system according to the present invention.

Referring to FIG. 3, a laser marking system according to an embodiment of the present invention is provided with a continuous-wave (CW) pumped Q-switch laser 1 which comprises a Nd:YAG laser rod 100, a ultrasonic Q-switch element 101 and other necessary optical elements including a pumping light source and mirrors. The ultrasonic Q-switch element 101 comprises a ultrasonic medium and a transducer as well known, which switches on and off according to a Q-SW control signal as described later. The pulse laser beam emitted by the CW-pumped Q-switch laser 1 is reflected by an optical-axis adjusting mirror 102 before passing though a beam expander 103. The pulse laser beam is further reflected by a X-scanning mirror 104 and a Y-scanning mirror 105 to become a scanning laser beam which is focused through a f-θ lens 106 onto the resin surface of a workpiece. The X-scanning mirror 104 and the Y-scanning mirror 105 are driven by galvano-scanners 107 and 108, respectively.

The laser marking system is further provided with a main controller 109 comprising a pulse width controller 110 and a galvano-scanner controller 111. The pulse width controller 110 receives a pulse width control signal PWC and a rate control signal CYC from a computer 112 and outputs a control pulse signal to a Q-switch driver 113. According to the control pulse signal, the Q-switch driver 113 outputs the Q-SW control signal to the ultrasonic Q-switch element 101. When the Q-SW control signal is activated, the ultrasonic Q-SW element 101 stops the CW-pumped Q-switch laser 1 emitting the laser beam. When the Q-SW control signal is deactivated, the ultrasonic Q-SW element 101 causes the laser 1 to emit the laser beam having a plurality of pulses of laser light. In other words, the pulse width control signal PWC is determined so that two or more laser emission pulses are output from the CW-pumped Q-switch laser 1. The galvano-scanner controller 111 receives a galvano-scanner control signal GC from the computer 112 and outputs a drive control signal to a galvano-scanner driver 114. According to the drive control signal, the galvano-scanner driver 114 drives the galvano-scanners 107 and 108 so as to scan the pulse laser beam in a specific pattern preset in the computer 112.

Figure 4:
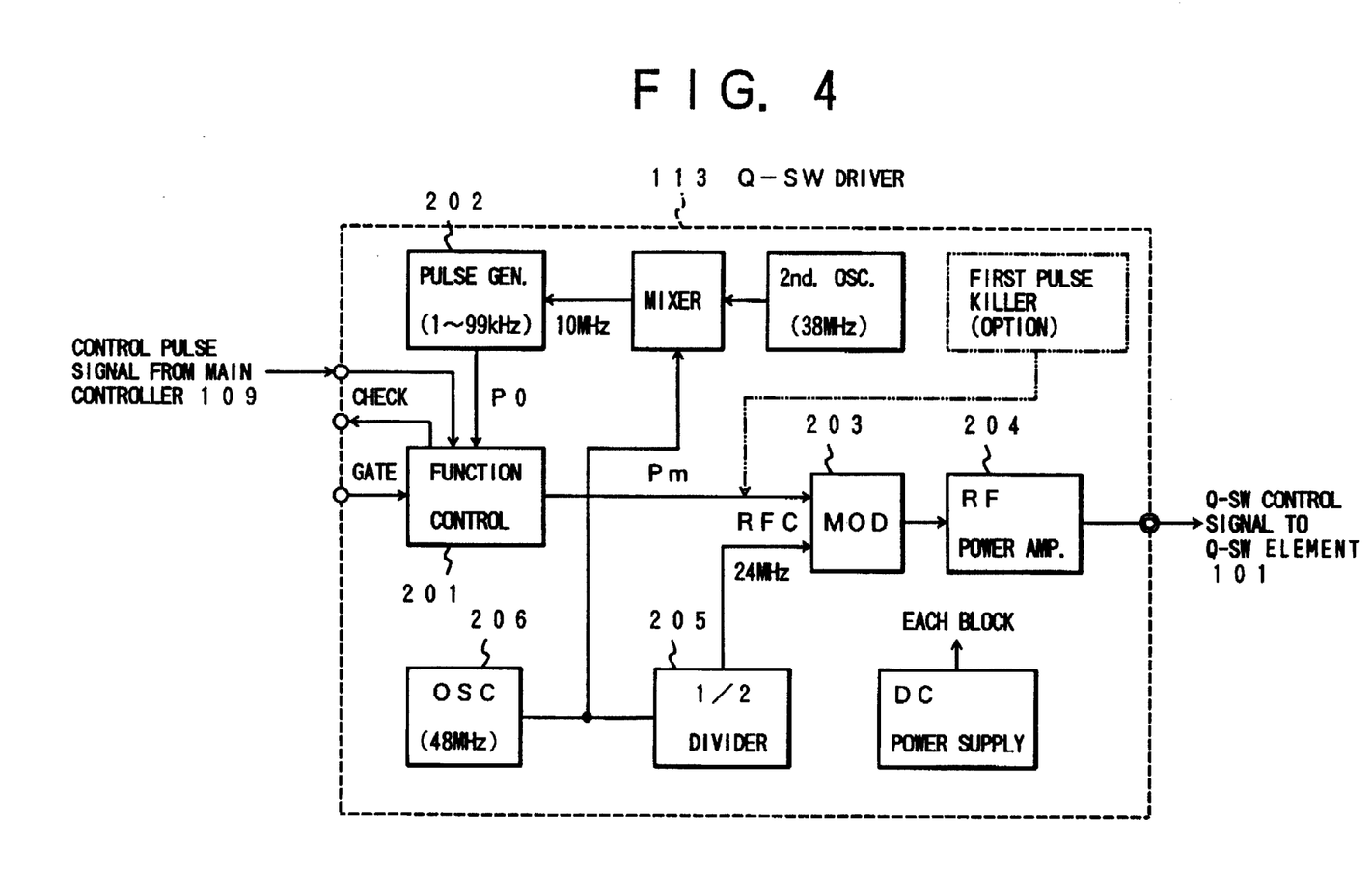
FIG. 4 is a detailed block diagram of a Q-SW driver in the embodiment.

As shown in FIG. 4, the Q-switch driver 113 receives the control pulse signal from the pulse width controller 110 of the main controller 109 and outputs the Q-switch control signal to the ultrasonic Q-switch element 101. A function controller 201 receives the control pulse signal from the pulse width controller 110 and a pulse signal of a predetermined frequency from a pulse generator 202 and outputs a modulating pulse signal Pm to a pulse modulator 203. The pulse modulator 203 performs pulse modulation of a radio-frequency (RF) signal RFC according to the modulating pulse signal Pm to output a modulated RF signal to a RF power amplifier 204. The RF signal RFC is obtained by a ½-divider 205 dividing a main RF signal generated by a primary oscillator 206. The modulated RF signal amplified by the RF power amplifier 204 is output as the Q-SW control signal to the ultrasonic Q-SW element 101 where the transducer generates a ultrasonic wave to switch between a high Q and a low Q according to the Q-SW control signal.

Figure 5:
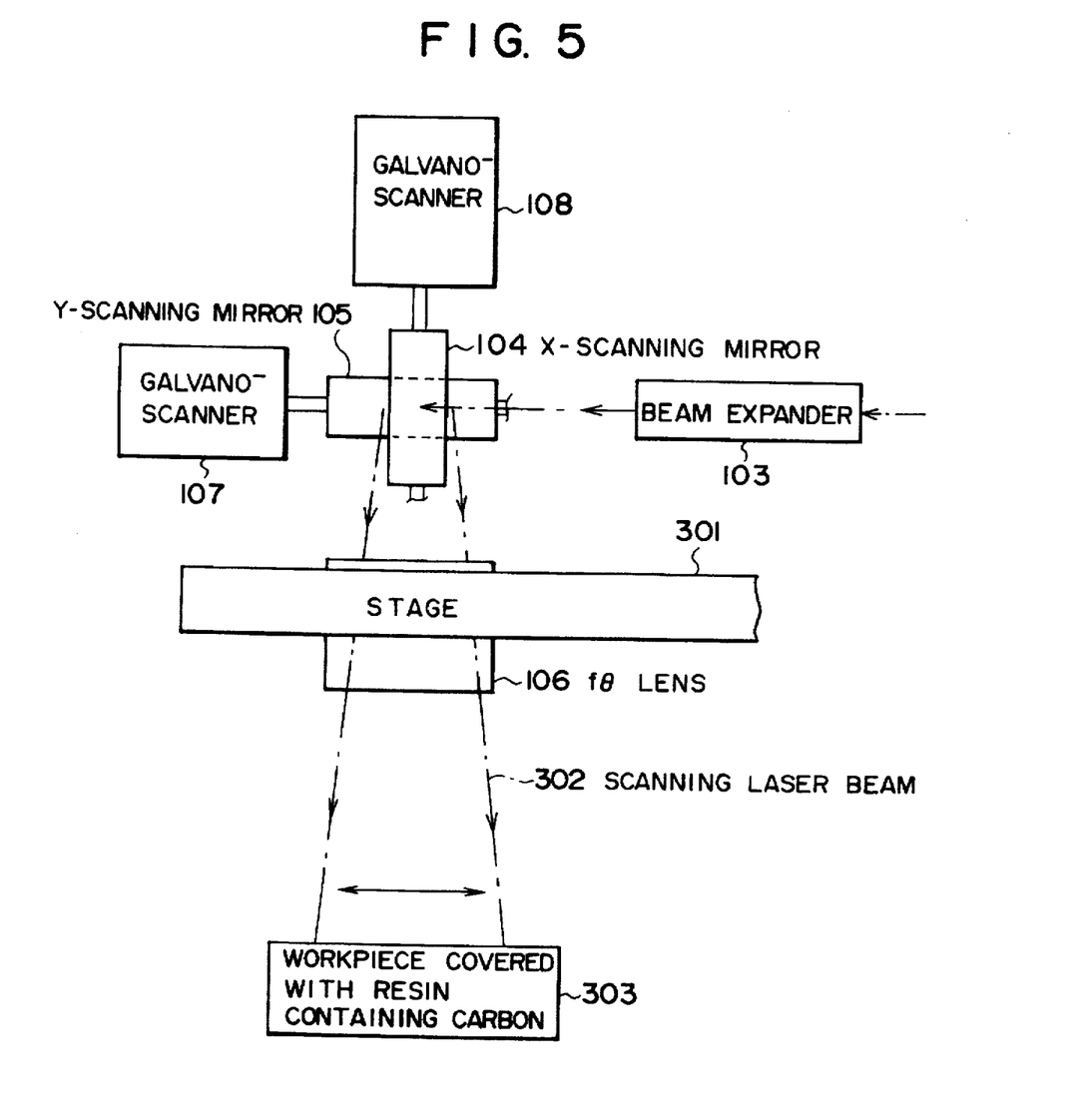
FIG. 5 is a schematic side view of the laser marking system of FIG. 3.

Referring to FIG. 5, the laser marking system is assembled on a stage 301 so that the elements achieve the following functions. The X-scanning mirror 104 reflects the pulse laser beam such that it scans in the X direction and the Y-scanning mirror 105 reflects the pulse laser beam reflected from the X-scanning mirror 105 such that it scans in the Y direction. The scanning pulse laser beam 302 reflected from the Y-scanning mirror 105 is focused through the f-θ lens 106 onto the surface of the workpiece 303. The workpiece 303 is covered with a resin containing carbon. The pulse width of the laser beam is determined in advance depending on the kind and/or thickness of the resin.

LASER DRIVING CONTROL

The computer 112 uses the pulse width control signal PWC to designate the pulse width of the laser beam emitted by the CW-pumped Q-switch laser 1. More specifically, receiving the pulse width control signal PWC and the rate control signal CYC from the computer 112, the pulse width controller 110 outputs the control pulse signal comprising pulses having the designated pulse width and the designated repetition rate to the Q-switch driver 113. According to the control pulse signal, the Q-switch driver 113 modulates the RF signal RFC to output the Q-SW control signal to the ultrasonic Q-SW element 101. The ultrasonic Q-switch element 101 is in the ON state, or the diffraction state, while receiving the RF signal from the Q-switch driver 113. Therefore, when the Q-switch element 101 is in the ON state, the CW-pumped Q-switch laser 1 is in the low-Q state, resulting in no laser beam emission. However, energy is being stored into the Nd:YAG rod 100 by continuously pumping during such a period of no laser emission. When the RF signal stops, the ultrasonic Q-switch element 101 switches to the OFF state, which causes the CW-pumped Q-switch laser 1 to be in the high-Q state, resulting in the laser beam emission. The state of the pulse beam emission is determined by the OFF state period (or the emission period) and the ON state (or the non-emission period). In other words, the pulse beam emission state is determined by the pulse width designated by the computer 112. According to the present invention, the emission period is set at a relatively long time period, for example, exceeding 10 μsec, so that the relaxation oscillation occurs in the CW-pumped Q-switch laser 1. Since this is one of main points of the present invention, it will be described in detail referring to FIGS. 6 and 7.

Figure 6:
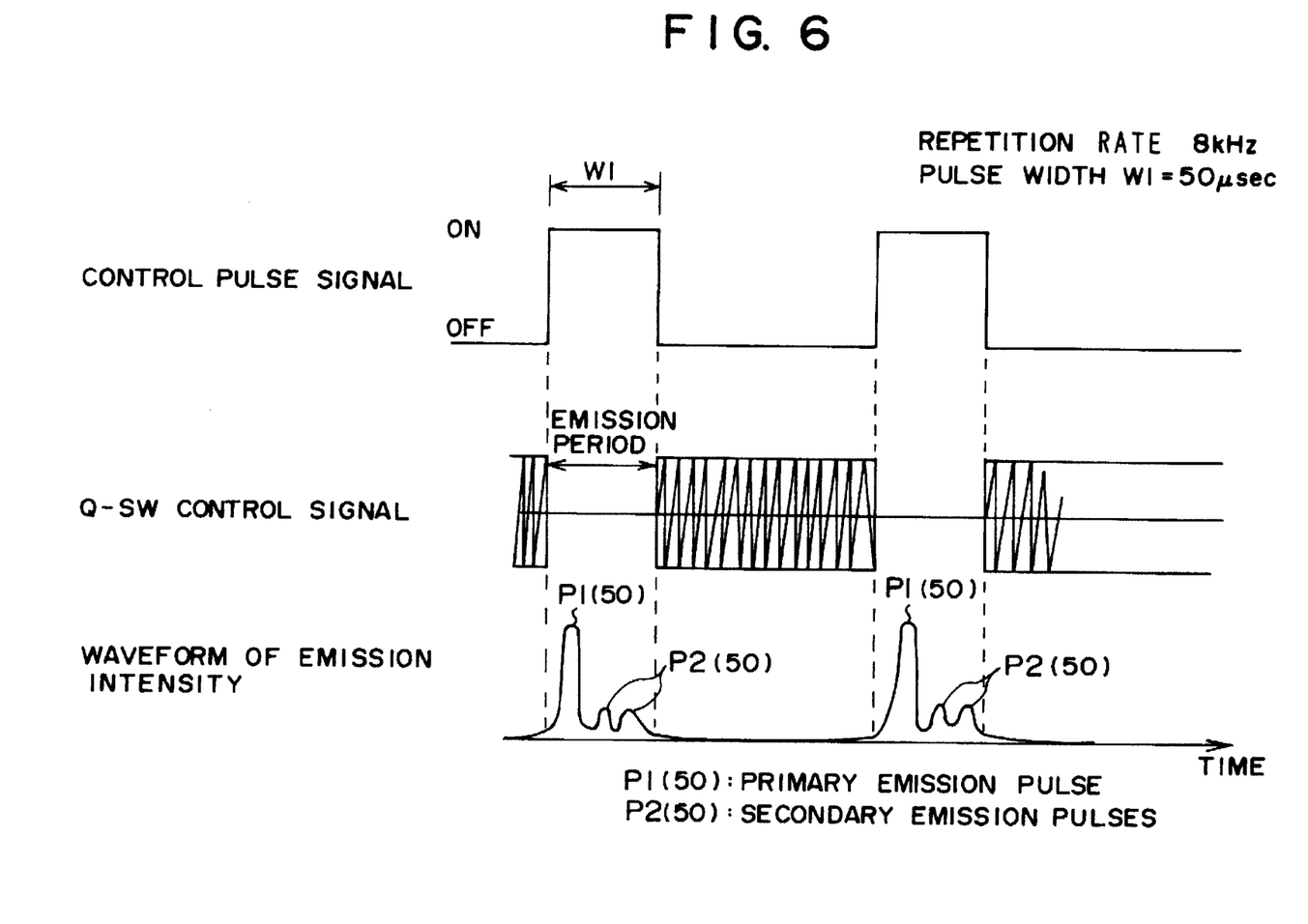
FIG. 6 is a waveform chart showing a first embodiment of a laser driving method at the pulse width of 50 microseconds according to the present invention.

As shown in FIG. 6, the Q-switch driver 113 receives the control pulse signal having a repetition rate of 8 kHz and a designated pulse width W1 of 50 μsec and outputs the Q-SW control signal having the emission period of 50 μsec to the ultrasonic Q-switch element 101. When setting the emission period at 50 μsec, the relaxation oscillation occurs in the CW-pumped Q-switch laser 1, resulting in a plurality of emission pulses comprising one primary emission pulse $P1_{(50)}$ and a plurality of secondary emission pulses $P2_{(50)}$ which are generated over the emission period. The secondary emission pulses $P2_{(50)}$ are caused by the relaxation oscillation and the intensities of the secondary emission pulses $P2_{(50)}$ are substantially lower than that of the primary emission pulse $P1_{(50)}$. In this case, the intensity of the primary emission pulse $P1_{(50)}$ is further lower than that of the emission pulse of the conventional laser as shown in FIG. 1. Therefore, by using such a pulse laser beam to produce the scanning laser beam 302 as shown in FIG. 4, relatively shallow marking lines can be drawn on the workpiece 303 covered with a relatively thin resin film (see FIG. 8A). The emission period of the CW-pumped Q-switch laser 1 may be adjusted depending on the characteristics of the resin of the workpiece.

Figure 7:
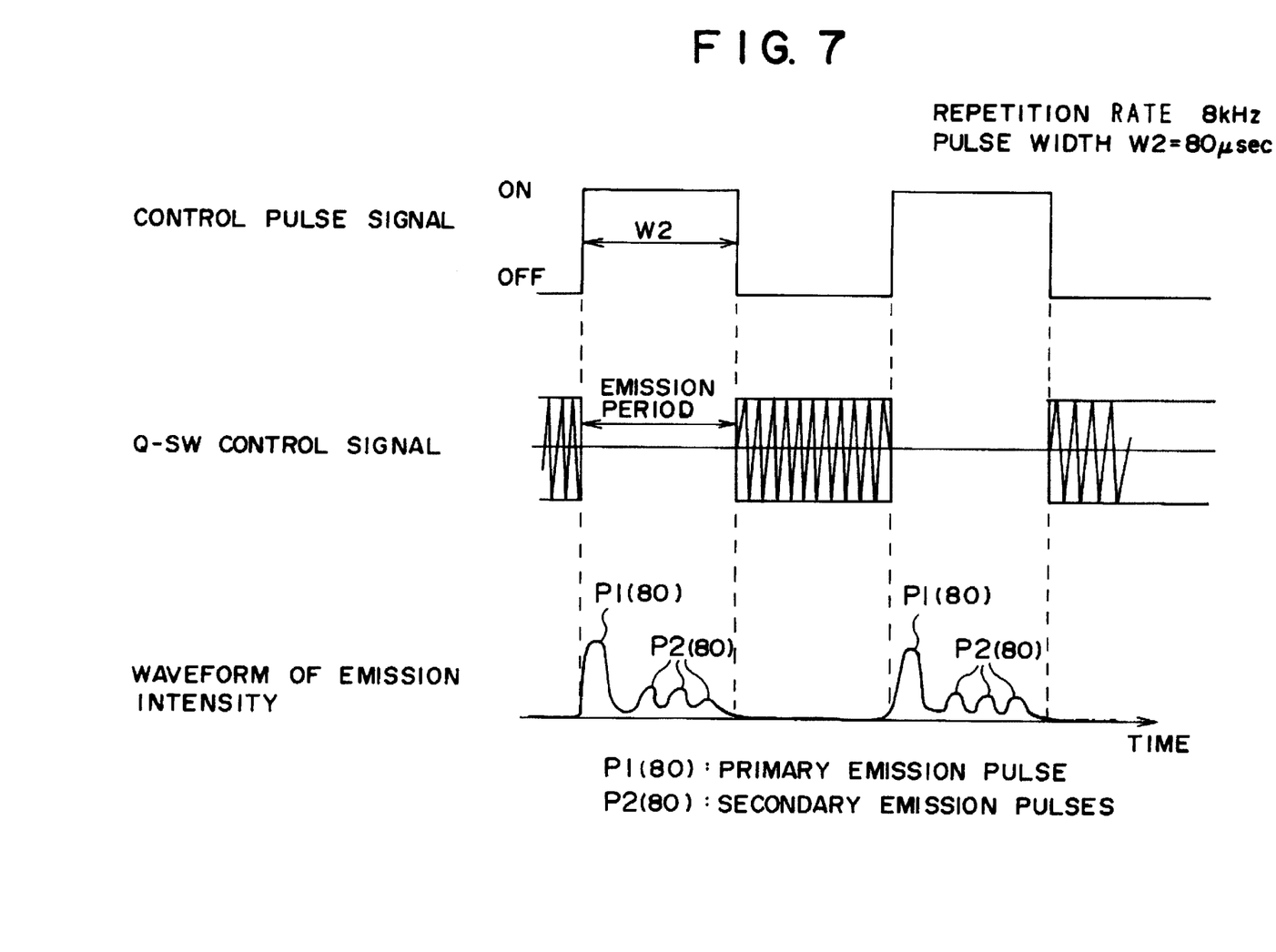
FIG. 7 is a waveform chart showing a second embodiment of the laser driving method at the pulse width of 80 microseconds according to the present invention.

As shown in FIG. 7, the Q-switch driver 113 receives the control pulse signal having a repetition rate of 8 kHz and a designated pulse width W2 of 80 μsec and outputs the Q-SW control signal having the emission period of 80 μsec to the ultrasonic Q-switch element 101. When setting the emission period at 80 μsec, the relaxation oscillation occurs in the CW-pumped Q-switch laser 1, resulting in a plurality of emission pulses comprising one primary emission pulse $P1_{(80)}$ and a plurality of secondary emission pulses $P2_{(80)}$ which are generated over the emission period. The secondary emission pulses $P2_{(80)}$ are caused by the relaxation oscillation and the intensities of the secondary emission pulses $P2_{(80)}$ are substantially lower than that of the primary emission pulse $P1_{(80)}$. In this case, the intensity of the primary emission pulse $P1_{(80)}$ is further lower than that of the emission pulse of the conventional laser as shown in FIG. 1. Therefore, by using such a pulse laser beam to produce the scanning laser beam 302 as shown in FIG. 4, relatively shallow marking lines can be drawn on the workpiece 303 covered with a relatively thin resin film (see FIG. 8B). Since the emission pulses $P1_{(80)}$ and $P2_{(80)}$ are lower in intensity than the emission pulses $P1_{(50)}$ and $P2_{(50)}$, the marking lines are produced by the emission pulses $P1_{(80)}$ and $P2_{(80)}$ at a more shallow depth than by the emission pulses $P1_{(50)}$ and $P2_{(50)}$.

Generally speaking, the repetition rate may be set at a desired value ranging from 5 kHz to 50 kHz, and the emission period, that is, the pulse width of the control pulse signal, may be adjusted within a range from 20 μsec to 200 μsec on condition that the relaxation oscillation occurs in the CW-pumped Q-switch laser 1 during the emission period. The repetition rate and the emission period may be determined depending on the kind of the resin of the workpiece and the performance of the CW-pumped Q-switch laser 1.

More specifically, in this embodiment, after selecting a desired repetition rate, the emission period is set at a value suitable for marking of the workpiece on condition that the relaxation oscillation occurs in the CW-pumped Q-switch laser 1 during the emission period.

From another view point, the computer 112 may designate the duty factor of the control pulse signal. In the present embodiment, the duty factor of the control pulse signal is more than 0.2 on condition that the relaxation oscillation occurs in the CW-pumped Q-switch laser 1 during the emission period. More specifically, the duty factor is 0.4 at a repetition rate of 8 kHz and a pulse width of 50 μsec, and the duty factor is 0.64 at a repetition rate of 8 kHz and a pulse width of 80 μsec. It is apparent that the same advantages are also obtained in this case.

Figure 8A:
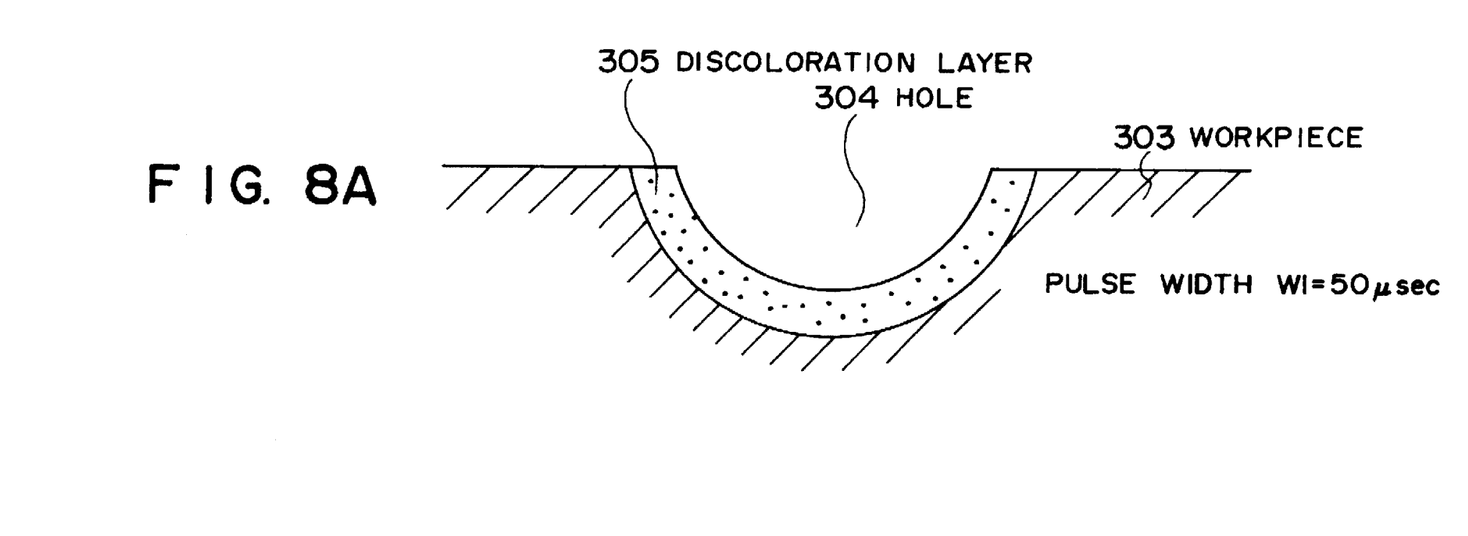
FIG. 8A is a schematic sectional view of a hole produced by vaporization according to the first embodiment.
Figure 8B:
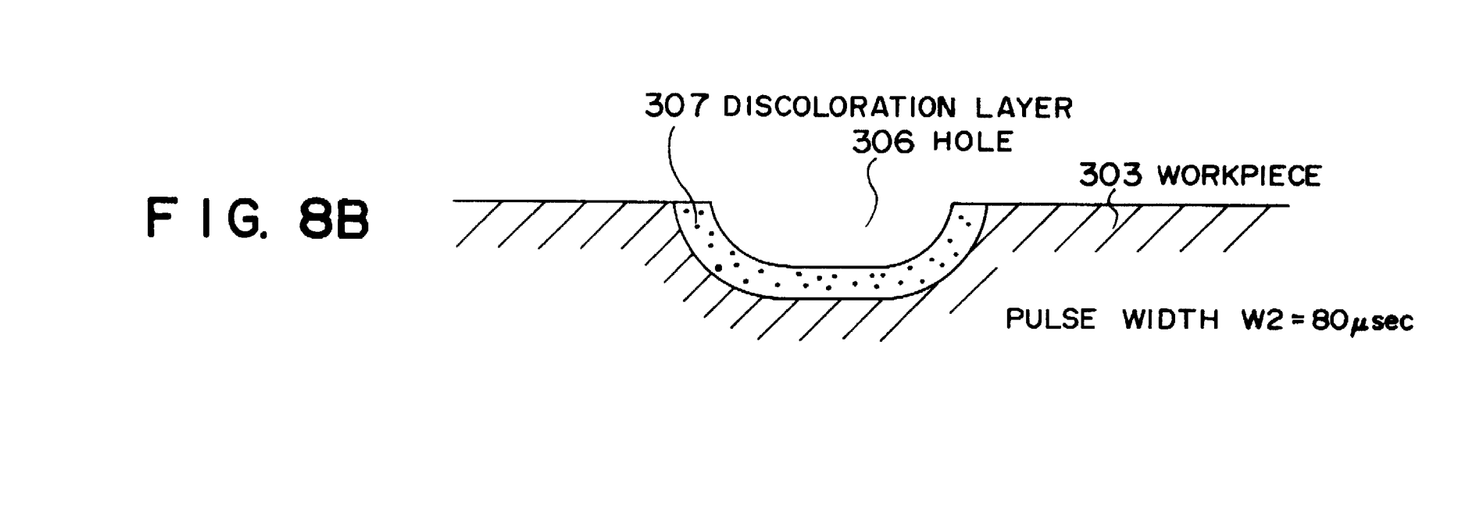
FIG. 8B is a schematic sectional view of a hole produced by vaporization according to the second embodiment.

In FIGS. 8A and 8B, assume that the workpiece 303 is covered with a resin containing carbon and the emission period or the duty factor is set as shown in FIG. 6 or 7. When the pulse laser beam according to the present invention is focused on a certain position of the workpiece 303, the resin at that position is heated, and thereby a relatively shallow hole 304 or 306 and a discoloration layer 305 or 307 are formed on the surface of the workpiece 303. As described above, since the pulse laser beam comprises a plurality of emission pulses in which the primary emission pulse has a relatively low intensity as shown in FIGS. 6 and 7, the vaporization of the resin is suppressed while the melt of the resin is accelerated. This causes the contained carbon to be deposited on the surface of the workpiece 303 due to the difference in a specific gravity between the resin and the carbon. After removing the deposited carbon from the surface of the workpiece 303, the discoloration layer 305 or 307 comes into view, resulting in high-contrast lines on the surface of the workpiece 303.

As illustrated in FIG. 8A, a hole 304 is formed at a relatively shallow depth due to the vaporization of the resin and the discoloration layer 305 is produced due to the melt of the resin, as mentioned above. The hole 304 and the discoloration layer 305 are formed by the pulse laser beam output from the CW-pumped Q-switch laser 1 at the repetition rate of 8 kHz and the pulse width of 50 μsec as shown in FIG. 6.

As illustrated in FIG. 8B, a hole 306 is formed at a relatively shallow depth due to the vaporization of the resin and the discoloration layer 307 is produced due to the melt of the resin, as mentioned above. The hole 306 and the discoloration layer 307 are formed by the pulse laser beam output from the CW-pumped Q-switch laser 1 at the repetition rate of 8 kHz and the pulse width of 80 μsec as shown in FIG. 7. Since the emission period W2 of this case is longer than that of the previous case as shown in FIG. 6, the intensity of the primary emission pulse $P1_{(80)}$ is lower than the primary emission pulse $P1_{(50)}$ and the total number of the emission pulses $P1_{(80)}$ and $P2_{(80)}$ is larger than that of the emission pulses $P1_{(50)}$ and $P2_{(50)}$. Therefore, the amount of the deposited carbon and the width of a marking line increase with the emission period and the depth of the marking line due to the vaporization decreases with increasing the emission period. As shown in FIG. 8B, the improved visibility of the marking lines can be achieved with a more shallow depth of the marking lines compared to the case as shown in FIG. 8A.

As mentioned above, the laser marking system according to the present invention is capable of changing the emission period of the pulse laser beam on condition that the repetition rate and the scanning speed of the pulse laser beam are kept at constant. Since the relatively long emission period causes the CW-pumped Q-switch laser to emit a plurality of laser emission pulses with relatively low intensities due to the relaxation oscillation, the marking lines are formed at a relatively shallow depth on the surface of the workpiece without decreasing the marking performance.

Further, in cases where the workpiece comprises a resin film containing carbon, a plurality of laser emission pulses due to the relaxation oscillation cause the increased amount of carbon deposition on the surface of the workpiece, resulting in the improved visibility of the marking lines.

Furthermore, since the emission period of the pulse laser beam is changed depending on a desired material of the workpiece, the optimal marking condition is easily set without decreasing the marking quality and performance regardless of the kind of a workpiece.

What is claimed is:

1. A laser marking method for marking a workpiece with a laser beam, said method comprising the steps of:

preparing a laser source which comprises a laser medium and a Q-switch element, said laser medium being continuously pumped, said Q-switch element switching on and off according to a repetition control signal, said repetition control signal comprising an emission period with a repetition rate, said repetition control signal switching said Q-switch fully off essentially instantaneously and maintaining said switched off Q-switch in its lossless state for each said emission period, and said laser source emitting said laser beam through said Q-switch element during said emission period;

adjusting said emission period of said repetition control signal such that said laser source emits a pulse laser beam comprising a plurality of emission pulses during said emission period;

changing said pulse laser beam in direction according to a predetermined pattern to generate a scanning pulse laser beam; and focusing said scanning pulse laser beam on a predetermined surface of said workpiece.

2. The method according to claim 1, wherein said emission pulses vary in number and intensity by adjusting said emission period.

3. The method according to claim 1, wherein said emission period of said repetition control signal is adjusted such that a relaxation oscillation occurs in said laser source during said emission period.

4. The method according to claim 1, wherein said emission period of said repetition control signal is adjusted such that during said emission period, said laser source emits said emission pulses, said emission pulses comprising:

a primary emission pulse caused by a primary emission oscillation; and a plurality of secondary emission pulses caused by a relaxation oscillation during said emission period.

5. The method according to claim 4, wherein said repetition control signal has a fixed repetition rate of 8 KHz and said emission period is 80 μsec.

6. The method according to claim 1, further comprising the step of:

placing said workpiece at a predetermined position such that said predetermined surface of said workpiece is scanned by said scanning pulse laser beam, said predetermined surface of said workpiece comprises a thermoplastic resin containing carbon:

melting and vaporizing portions of said predetermined surface of said workpiece by said scanning pulse laser beam in said predetermined pattern so that said carbon contained in said thermoplastic resin is deposited on said portions; and removing said carbon deposited on said portions from said predetermined surface of said workpiece.

7. The method according to claim 1, wherein said emission period of said repetition control signal is adjusted by setting a duty factor of said repetition control signal.

8. The method according to claim 7, wherein said duty factor is set at 0.64.

9. The method according to claim 1, wherein said laser medium is a Nd:YAG rod and said Q-switch element is an acousto-optic diffraction switch.

10. The method according to claim 1, wherein said repetition control signal has a fixed repetition rate falling within a range from 5 kHz to 50 kHz and said emission period is adjusted to a period ranging from 20 μsec to 200 μsec.

11. The method according to claim 10, wherein said repetition control signal has a fixed repetition rate of 8 KHz and said emission period is 80 μsec.

12. A system for marking a workpiece with a laser beam, said system comprising:

a laser source comprising a laser medium and a Q-switch element, said laser medium being continuously pumped, said Q-switch element switching on and off according to a repetition control signal, said repetition control signal comprising an emission period with a repetition rate, said Q-switch being switched fully off essentially instantaneously and maintained in its lossless states for each said emission period, and said laser source emitting said laser beam through said Q-switch element during said emission period;

a laser controller for variably setting said emission period of said repetition control signal such that said laser source emits a pulse laser beam comprising a plurality of emission pulses during said emission period;

scanning means for changing said pulse laser beam in direction according to a predetermined pattern to generate a scanning pulse laser beam; and optical means for focusing said scanning pulse laser beam on a predetermined surface of said workpiece.

13. The system according to claim 12, wherein said emission pulses vary in number and intensity by adjusting said emission period.

14. The system according to claim 12, wherein said Q-switch element comprises an acousto-optic diffraction switch; and said laser controller comprises:

a pulse width controller for generating a control pulse signal having an ON period corresponding to said emission period in a cycle; and a Q-switch driver for generating said repetition control signal to said Q-switch element of said laser source, said repetition control signal comprising a high-frequency wave during periods other than said emission period, said high-frequency wave causing said Q-switch element to generate a ultrasonic wave for diffraction.

15. The system according to claim 12, wherein said scanning means comprises:

a first scanning mirror for reflecting said pulse laser beam with changing in a first direction based on said predetermined pattern; and a second scanning mirror for reflecting said pulse laser beam with changing in a second direction orthogonal to said first direction based on said predetermined pattern.

16. The system according to claim 12, wherein said predetermined surface of said workpiece comprises a thermoplastic resin containing carbon.

17. The system according to claim 12, wherein said laser controller sets said emission period of said repetition control signal by adjusting a duty factor of said repetition control signal.

18. The system according to claim 12, wherein said laser medium is a Nd:YAG rod, said Q-switch element is an acousto-optic diffraction switch, said repetition control signal has a fixed repetition rate falling within a range from 5 kHz to 50 kHz and said emission period is adjusted to a period ranging from 20 μsec to 200 μsec.

19. The system according to claim 12, wherein said repetition control signal has a fixed repetition rate falling within a range from 5 kHz to 50 kHz and said emission period is adjusted to a period ranging from 20 μsec to 200 μsec.

20. A laser marking method for marking a workpiece with a laser beam, said method comprising the steps of:

preparing a laser source which comprises a laser medium and a Q-switch element, said laser medium being continuously pumped, said Q-switch element switching on and off according to a repetition control signal, said repetition control signal comprising an emission period with a repetition rate of 8 KHz, said repetition control signal switching said Q-switch fully off essentially instantaneously and maintaining said switched off Q-switch in its lossless state for each said emission period, and said laser source emitting said laser beam through said Q-switch element during said emission period;

setting said emission period of said repetition control signal at 80 μsec, said laser source emitting a pulse laser beam comprising four emission pulses during said emission period;

changing said pulse laser beam in direction according to a predetermined pattern to generate a scanning pulse laser beam; and focusing said scanning pulse laser beam on a predetermined surface of said workpiece.

21. The method according to claim 20, wherein during said emission period, said laser source emits one primary emission pulse and three secondary emission pulses.

22. The method according to claim 21, further comprising the step of:

placing said workpiece at a predetermined position such that said predetermined surface of said workpiece is scanned by said scanning pulse laser beam, said predetermined surface of said workpiece comprises a thermoplastic resin containing carbon;

melting and vaporizing portions of said predetermined surface of said workpiece by said scanning pulse laser beam in said predetermined pattern so that said carbon contained in said thermoplastic resin is deposited on said portions; and removing said carbon deposited on said portions from said predetermined surface of said workpiece.

23. The method according to claim 22 wherein said laser medium comprises a Nd:YAG rod and said Q-switch element comprises an acousto-optic diffraction switch.

24. A laser marking method for marking a workpiece with a laser beam, said method comprising the steps of:

preparing a laser source which comprises a laser medium and a Q-switch element, said laser medium being continuously pumped, said Q-switch element switching on and off according to a repetition control signal, said repetition control signal comprising an emission period with a repetition rate, said repetition control signal switching said Q-switch fully off essentially instantaneously and maintaining said switched off Q-switch in its lossless state for each said emission period, and said laser source emitting said laser beam through said Q-switch element during said emission period;

adjusting said emission period of said repetition control signal such that said laser source emits a pulse laser beam comprising a primary emission pulse and at least one secondary emission pulse during said emission period, said primary emission pulse being caused by a primary emission oscillation and said at least one secondary emission pulse caused by a relaxation oscillation during said emission period;

changing said pulse laser beam in direction according to a predetermined pattern to generate a scanning pulse laser beam; and focusing said scanning pulse laser beam on a predetermined surface of said workpiece.

25. The method according to claim 24, further comprising the step of:

placing said workpiece at a predetermined position such that said predetermined surface of said workpiece is scanned by said scanning pulse laser beam, said predetermined surface of said workpiece comprises a thermoplastic resin containing carbon;

melting and vaporizing portions of said predetermined surface of said workpiece by said scanning pulse laser beam in said predetermined pattern so that said carbon contained in said thermoplastic resin is deposited on said portions; and removing said carbon deposited on said portions from said predetermined surface of said workpiece.

26. The method according to claim 25 wherein said laser medium comprises a Nd:YAG rod and said Q-switch element comprises an acousto-optic diffraction switch.

27. A system for marking a workpiece with a laser beam, said system comprising:

a laser source comprising a laser medium and a Q-switch element, said laser medium being continuously pumped, said Q-switch element switching on and off according to a repetition control signal, said repetition control signal comprising an emission period with a repetition rate, said Q-switch being switched fully off essentially instantaneously and maintained in its lossless states for each said emission period, and said laser source emitting said laser beam through said Q-switch element during said emission period;

a laser controller for setting said emission period of said repetition control signal such that said laser source emits a pulse laser beam comprising a primary and at least one secondary emission pulse during said emission period;

scanning means for changing said pulse laser beam in direction according to a predetermined pattern to generate a scanning pulse laser beam; and optical means for focusing said scanning pulse laser beam on a predetermined surface of said workpiece.

28. The system according to claim 27, wherein said Q-switch element comprises an acousto-optic diffraction switch; and said laser controller comprises:

a pulse width controller for generating a control pulse signal having an ON period corresponding to said emission period in a cycle; and a Q-switch driver for generating said repetition control signal to said Q-switch element of said laser source, said repetition control signal comprising a high-frequency wave during periods other than said emission period, said high-frequency wave causing said Q-switch element to generate a ultrasonic wave for diffraction.

29. The system according to claim 27, wherein said scanning means comprises:

a first scanning mirror for reflecting said pulse laser beam with changing in a first direction based on said predetermined pattern; and a second scanning mirror for reflecting said pulse laser beam with changing in a second direction orthogonal to said first direction based on said predetermined pattern.

30. The system according to claim 27, wherein said predetermined surface of said workpiece comprises a thermoplastic resin containing carbon.

31. The system according to claim 27, wherein said laser controller sets said emission period of said repetition control signal by adjusting a duty factor of said repetition control signal.

32. The system according to claim 27, wherein said laser medium is a Nd:YAG rod, said Q-switch element is an acousto-optic diffraction switch, said repetition control signal has a fixed repetition rate falling within a range from 5 kHz to 50 kHz and said emission period is adjusted to a period ranging from 20 μsec to 200 μsec.

33. The system according to claim 27, wherein said repetition control signal has a fixed repetition rate falling within a range from 5 KHz to 50 KHz and said emission period is adjusted to a period ranging from 20 μsec to 200 μsec.

* * * * *